(12) United States Patent
Jung et al.

(10) Patent No.: US 10,996,772 B2
(45) Date of Patent: May 4, 2021

(54) STRUCTURE OF DIGITAL PEN INCLUDING ANTENNA

(71) Applicant: Samsung Electronics Co., Ltd., Gyeonggi-do (KR)

(72) Inventors: Hyukjin Jung, Gyeonggi-do (KR); Minsoo Kim, Gyeonggi-do (KR); Jinman Kim, Gyeonggi-do (KR); Kwangho Shin, Gyeonggi-do (KR); Jinwan An, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/547,800

(22) Filed: Aug. 22, 2019

(65) Prior Publication Data

US 2020/0167012 A1 May 28, 2020

(30) Foreign Application Priority Data

Nov. 22, 2018 (KR) .................. 10-2018-0145271

(51) Int. Cl.
| | |
|---|---|
| *G06F 3/0354* | (2013.01) |
| *H01F 38/14* | (2006.01) |
| *H01F 17/04* | (2006.01) |
| *H02J 50/12* | (2016.01) |
| *G06F 3/038* | (2013.01) |
| *H02J 7/02* | (2016.01) |
| *H04W 4/40* | (2018.01) |

(52) U.S. Cl.
CPC .......... *G06F 3/03545* (2013.01); *G06F 3/038* (2013.01); *H01F 17/045* (2013.01); *H01F 38/14* (2013.01); *H02J 7/025* (2013.01); *H02J 50/12* (2016.02); *G06F 2203/0384* (2013.01); *H01F 2038/143* (2013.01); *H04W 4/40* (2018.02)

(58) Field of Classification Search
CPC ................. G06F 3/03545; G06F 3/038; G06F 2203/0384; H02J 50/12; H02J 7/025; H01F 17/045; H01F 38/14; H01F 2038/143; H04W 4/40
See application file for complete search history.

(56) References Cited

U.S. PATENT DOCUMENTS

| | | | |
|---|---|---|---|
| 10,296,113 B2* | 5/2019 | Eguchi | G06F 3/03545 |
| 10,698,524 B2* | 6/2020 | Park | G06F 3/0442 |

(Continued)

FOREIGN PATENT DOCUMENTS

| | | |
|---|---|---|
| EP | 2 650 758 B1 | 8/2017 |
| JP | 2011-065450 A | 3/2011 |
| KR | 10-2018-0124398 A | 11/2018 |

OTHER PUBLICATIONS

International Search Report dated Dec. 20, 2019.

*Primary Examiner* — Sejoon Ahn
(74) *Attorney, Agent, or Firm* — Cha & Reiter, LLC.

(57) ABSTRACT

An electronic device includes a housing that includes a first end portion and a second end portion, a pen tip that is disposed at the first end portion, a first coil that is disposed in the housing adjacent to the first end portion, is wound around an axis of the housing, and includes a first conductive line of a first length, and a second coil that surrounds the first coil, is wound around the axis of the housing, and includes a second conductive line of a second length shorter than the first length.

18 Claims, 10 Drawing Sheets

(56) References Cited

U.S. PATENT DOCUMENTS

| | | | |
|---|---|---|---|
| 2001/0001430 A1* | 5/2001 | Ely | G06F 1/1626 |
| | | | 178/18.03 |
| 2006/0046650 A1* | 3/2006 | Kohli | H04M 1/0202 |
| | | | 455/41.2 |
| 2006/0055686 A1* | 3/2006 | Lee | H01Q 1/2266 |
| | | | 345/179 |
| 2006/0060393 A1 | 3/2006 | Fukushima et al. | |
| 2007/0054250 A1* | 3/2007 | Pahr | G09B 11/06 |
| | | | 434/236 |
| 2009/0236153 A1* | 9/2009 | Kyung | G06F 1/20 |
| | | | 178/19.01 |
| 2010/0207607 A1 | 8/2010 | Katsurahira et al. | |
| 2011/0007037 A1* | 1/2011 | Ogawa | G06F 3/045 |
| | | | 345/179 |
| 2013/0201162 A1* | 8/2013 | Cavilia | G06F 3/03545 |
| | | | 345/179 |
| 2013/0257782 A1* | 10/2013 | Nakagawa | G06F 3/0416 |
| | | | 345/173 |
| 2014/0253464 A1* | 9/2014 | Hicks | G06F 3/0488 |
| | | | 345/173 |
| 2016/0094045 A1* | 3/2016 | Bae | H01F 38/14 |
| | | | 307/104 |
| 2018/0101251 A1 | 4/2018 | Fujitsuka et al. | |
| 2018/0181222 A1* | 6/2018 | Ivanov | G01J 3/027 |
| 2018/0329527 A1 | 11/2018 | Park et al. | |
| 2020/0019257 A1* | 1/2020 | Chang | G06F 3/03545 |

* cited by examiner

STRUCTURE OF DIGITAL PEN INCLUDING ANTENNA

CROSS-REFERENCE TO RELATED APPLICATION(S)

This application is based on and claims priority under 35 U.S.C. § 119 to Korean Patent Application No. 10-2018-0145271, filed on Nov. 22, 2018, in the Korean Intellectual Property Office, the disclosure of which is incorporated by reference herein its entirety.

BACKGROUND

1. Field

The disclosure generally relates to structures of a digital pen that may include an antenna.

2. Description of Related Art

Digital pen (or stylus pen) may allow the user to input handwriting on an external electronic device (e.g., smartphone or tablet). In addition to the handwriting input function, the digital pen may transmit or receive data to or from the external electronic device through short-range wireless communication. The digital pen may include a coil configured to be an antenna for the short-range wireless communication.

The above information is presented as background information only to assist with an understanding of the disclosure. No determination has been made, and no assertion is made, as to whether any of the above might be applicable as prior art with regard to the disclosure.

SUMMARY

In the conventional arts, a digital pen may include a coil (hereinafter referred to as a "first coil") configured to transmit or receive signals in an electro-magnetic induction manner, and a coil (hereinafter referred to as a "second coil") configured to be the antenna for short-range wireless communication. The first coil may be disposed adjacent to the pen tip of the digital pen (e.g. at the front end portion of the digital pen) such that the digital pen employs electro-magnetic induction to perform the handwriting function. The first coil may be electrically connected with a battery and a charging circuit of the digital pen. The second coil may be disposed at the rear end portion of a housing of the digital pen for the purpose of optimizing radiation for the wireless communication signals of the short-range wireless communication. For example, the digital pen may include the second coil at the rear end portion of a printed circuit board (PCB) disposed in the digital pen such that a fillcut region of the printed circuit board may be provided and such that an active power element in the digital pen is sufficiently spaced apart from the second coil.

In the case where the second coil is disposed at the rear end portion of the printed circuit board, antenna performance of the second coil may be reduced where the user grips the digital pen with his/her hand. Also, when the housing of the digital pen is metallic, a portion of the signal radiated from the second coil may be reflected by the metallic housing. In this case, performance of the antenna for wireless communication may be deteriorated.

Alternatively, a digital pen may perform both wireless communication and battery charging using the first coil alone without the second coil. However, when the first coil is connected with both the communication circuit and the charging circuit, a leakage current may be generated due to the path connected with the communication circuit. Because the charging current may be about 1 milli-ampere (mA), the variation in impedance caused by the leakage current may in turn cause a decrease in charging efficiency.

In accordance with an aspect of the disclosure, an electronic device may include a housing that includes a first end portion and a second end portion, a pen tip that is disposed at the first end portion, a first coil that is disposed in the housing adjacent to the first end portion, is wound around an axis of the housing, and includes a first conductive line of a first length, and a second coil that surrounds the first coil, is wound around the axis of the housing, and includes a second conductive line of a second length shorter than the first length.

In accordance with another aspect of the disclosure, a digital pen may include a housing that includes a first end portion and a second end portion and is made of metal, a pen tip that is disposed at the first end portion, a first coil that is disposed in the housing adjacent to the first end portion, is wound around an axis of the housing, and radiates a signal based on electro-magnetic induction, and a second coil that surrounds the first coil, is wound around the axis of the housing, and radiates a signal based on a short-range wireless communication protocol.

In accordance with another aspect of the disclosure, an electronic device may include a housing, a first wireless communication circuit, and a digital pen capable of being inserted into an inner space of the housing. The digital pen may include a pen housing that includes a first end portion and a second end portion and is made of metal material, a pen tip that is disposed at the first end portion, a second wireless communication circuit that is disposed in the pen housing and communicates with the first wireless communication circuit based on a short-range wireless communication protocol, a first coil that is disposed in the pen housing adjacent to the first end portion, is wound around an axis of the housing, and includes a first conductive line of a first length, and a second coil that is electrically connected with the second wireless communication circuit, surrounds the first coil, is wound around the axis of the housing, and includes a second conductive line of a second length shorter than the first length.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of drawings, similar components may be marked by similar reference numerals.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Aspects of the disclosure are to address at least the above-mentioned problems and/or disadvantages and to provide at least the advantages described below. For example, one aspect of the disclosure is to provide a digital pen having a structure that is capable of preventing degradation of antenna performance, where the antenna supports short-range wireless communication.

Figure 1:
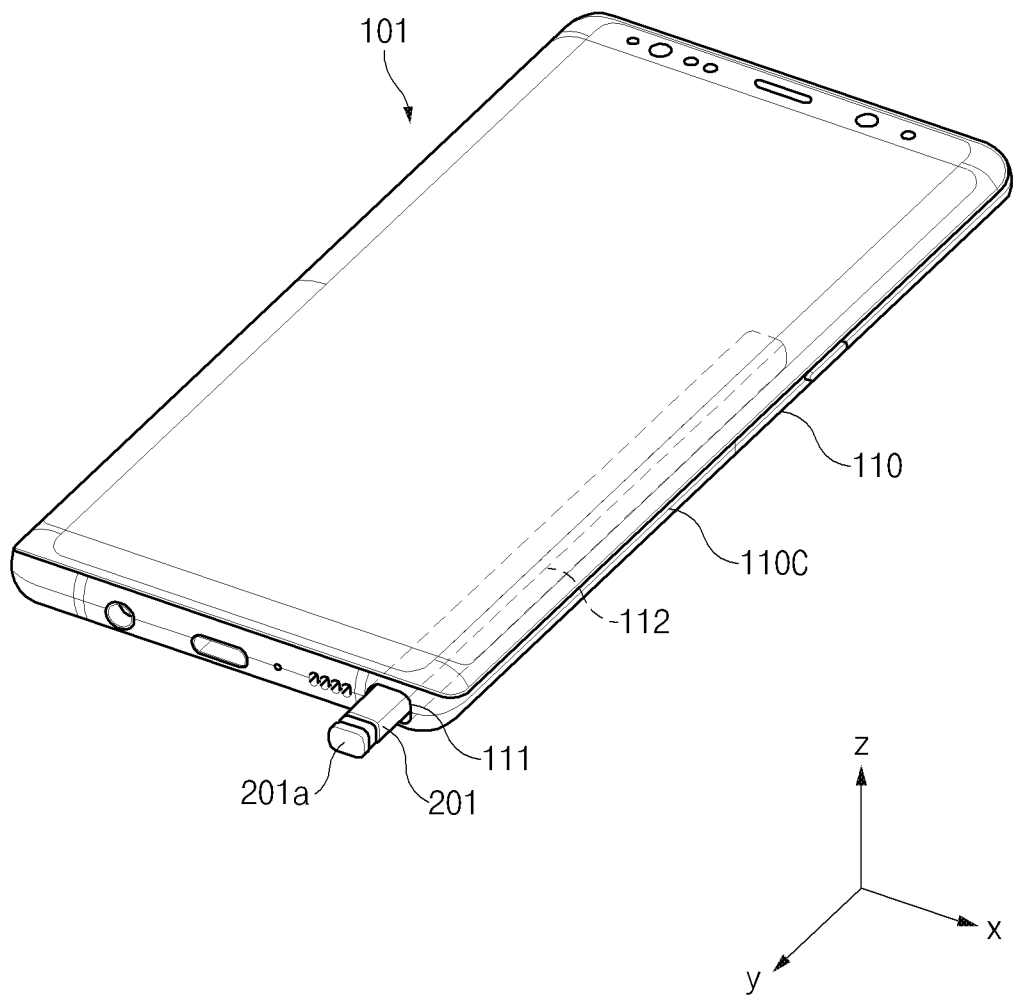
FIG. 1 is a perspective view of an electronic device including a digital pen according to an embodiment.

FIG. 1 is a perspective view of an electronic device 101 including a digital pen 201 according to an embodiment.

Referring to FIG. 1, the electronic device 101 according to an embodiment may include a structure for the digital pen 201 (e.g., a stylus pen) to be inserted. The electronic device 101 may include a housing 110, which in turn may include a hole 111 at one portion of the housing 110, for example, one portion of a side surface 110C. According to an embodiment, the electronic device 101 may include a receiving space 112 connected with the hole 111, and the digital pen 201 may be inserted into the receiving space 112. According to the embodiment illustrated, the digital pen 201 may include a button 201a, which is capable of being pressed, at one end portion thereof such that the digital pen 201 is easily pulled out from the receiving space 112 of the electronic device 101. That is, when the button 201a is pushed, a repulsion mechanism (e.g., at least one spring) linked to the button 201a activates, and the digital pen 201 may be partially expelled from the receiving space 112 such that it may be detached from the receiving space 112 by the user.

Figure 2:
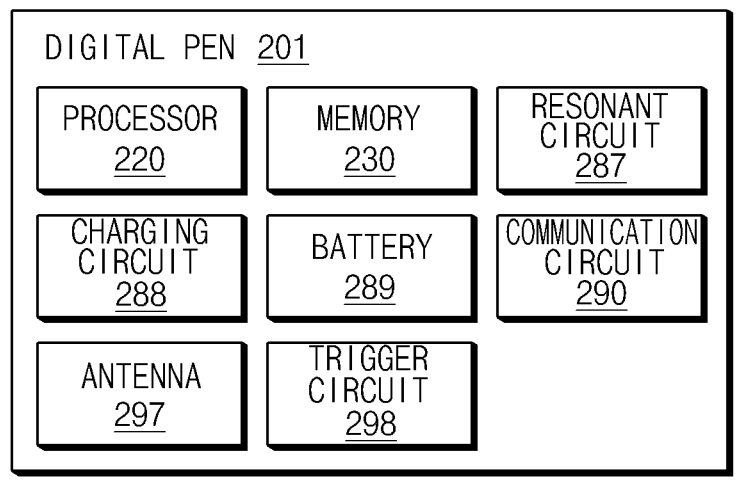
FIG. 2 is a block diagram illustrating a digital pen according to an embodiment.

FIG. 2 is a block diagram illustrating the digital pen 201 according to an embodiment.

Referring to FIG. 2, the digital pen 201 according to an embodiment may include a processor 220, a memory 230, a resonant circuit 287, a charging circuit 288, a battery 289, a communication circuit 290, an antenna 297, and/or a trigger circuit 298. In some embodiments, in the digital pen 201, the processor 220, at least a part of the resonant circuit 287, and/or at least a part of the communication circuit 290 may be implemented on a printed circuit board (PCB) or may be implemented in the form of a chip. The processor 220, the resonant circuit 287, and/or the communication circuit 290 may be electrically connected with the memory 230, the charging circuit 288, the battery 289, the antenna 297, and the trigger circuit 298. Alternatively, some of the above components may be omitted and the digital pen 201 according to an embodiment may be implemented only with a resonant circuit and a button.

According to an embodiment, the processor 220 may include a generic processor configured to execute customized software (e.g., an application program). As such, the processor 220 may include both hardware component and software component. The processor may further include the following components: various sensors, data measurement module, input/output interface, module to manage state or environment of the digital pen 201, and/or a communication module. Alternatively, the above may be implemented as separate components distinct from the processor 220. The processor 220 may include one of hardware, software, or firmware, or a combination of two or more thereof. The processor 220 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101. According to an embodiment, the processor 220 may receive a proximity signal corresponding to an electro-magnetic signal that is generated from a digitizer (e.g., at least a part of a display device) of the electronic device 101 through the resonant circuit 287. When the proximity signal is identified, the processor 220 may control the resonant circuit 287 such that an electromagnetic resonance (EMR) input signal is transmitted to the electronic device 101.

According to an embodiment, the memory 230 may store information associated with operations of the digital pen 201. For example, the information may include information for communication with the electronic device 101 and frequency information associated with input operations of the digital pen 201.

According to an embodiment, the resonant circuit 287 may include at least one of a coil, an inductor, or a capacitor. The resonant circuit 287 may be used by the digital pen 201 to generate a signal with a particular resonant frequency. For example, to generate the signal, the digital pen 201 may use various methods such as electro-magnetic resonance (EMR), active electrostatic (AES) method, or electrically coupled resonance (ECR). In the case where the digital pen 201 transmits an EMR signal, the digital pen 201 may generate a signal with a particular resonant frequency, based on an electro-magnetic field generated from an inductive panel of the electronic device 101. In the case where the digital pen 201 transmits an AES signal, the digital pen 201 may generate a signal by using the capacitive coupling with the electronic device 101. In the case where the digital pen 201 transmits an ECR signal, the digital pen 201 may generate a signal with a particular resonant frequency, based on an electric field generated from a capacitive device of the electronic device 101. According to an embodiment, the resonant circuit 287 may be used to change the intensity of the electro-magnetic field or the frequency depending on how the digital pen 201 is manipulated by the user. For example, the resonant circuit 287 may provide different frequencies for various inputs such as hovering input, drawing input, button input, or erasing input.

According to an embodiment, when the charging circuit 288 is connected with the resonant circuit 287 via a switching circuit, the charging circuit 288 may rectify the resonant signal generated from the resonant circuit 287 to be a direct current signal, which in turn can be supplied to the battery 289. According to an embodiment, the digital pen 201 may determine whether the digital pen 201 is inserted into the electronic device 101, by using the voltage level of the direct current signal detected from the charging circuit 288.

According to an embodiment, the battery 289 may store energy necessary for operations of the digital pen 201. For example, the battery 289 may include a lithium-ion battery or a capacitor, and may be rechargeable or user-swappable. According to an embodiment, the battery 289 may be charged by using power (e.g., via a direct current signal or direct current power) provided from the charging circuit 288.

According to an embodiment, the communication circuit 290 may be configured to perform wireless communication between the digital pen 201 and a communication module of the electronic device 101. According to an embodiment, the communication circuit 290 may transmit state information and input information of the digital pen 201 to the electronic device 101 by using short-range communication. For example, the communication circuit 290 may transmit direction information (e.g., motion sensor data) of the digital pen 201 obtained through the trigger circuit 298, voice information input through a microphone, or level information of the battery 289 (e.g. amount of residue energy left in the battery 289). For example, the method of short-range communication employed may include at least one of Bluetooth low energy (BLE) or wireless LAN.

According to an embodiment, the antenna 297 may be used to transmit signal or power to an external device (e.g., the electronic device 101) or to receive signal or power from the external device. According to an embodiment, the digital pen 201 may include a plurality of antennas 297 and may select at least one antenna 297 appropriate for a chosen communication method. The communication circuit 290 may exchange signal or power with the external electronic device through the selected antenna 297.

According to an embodiment, the trigger circuit 298 may include at least one button or sensor circuit. According to an embodiment, the processor 220 may identify an input (e.g., touch or push) on the button of the digital pen 201, where the button may be a button that enables for example EMR or BLE functionality. According to an embodiment, the sensor circuit may generate an electrical signal or a data value that corresponds to an internal operation state of the digital pen 201 or corresponds to an external environment state. For example, the sensor circuit may include at least one of motion sensor, battery level detection sensor, pressure sensor, light sensor, temperature sensor, geomagnetic sensor, or biometric sensor. According to an embodiment, the trigger circuit 298 may transmit a trigger signal to the electronic device 101 based on the input signal of the button or a signal obtained through the sensor.

Figure 3:
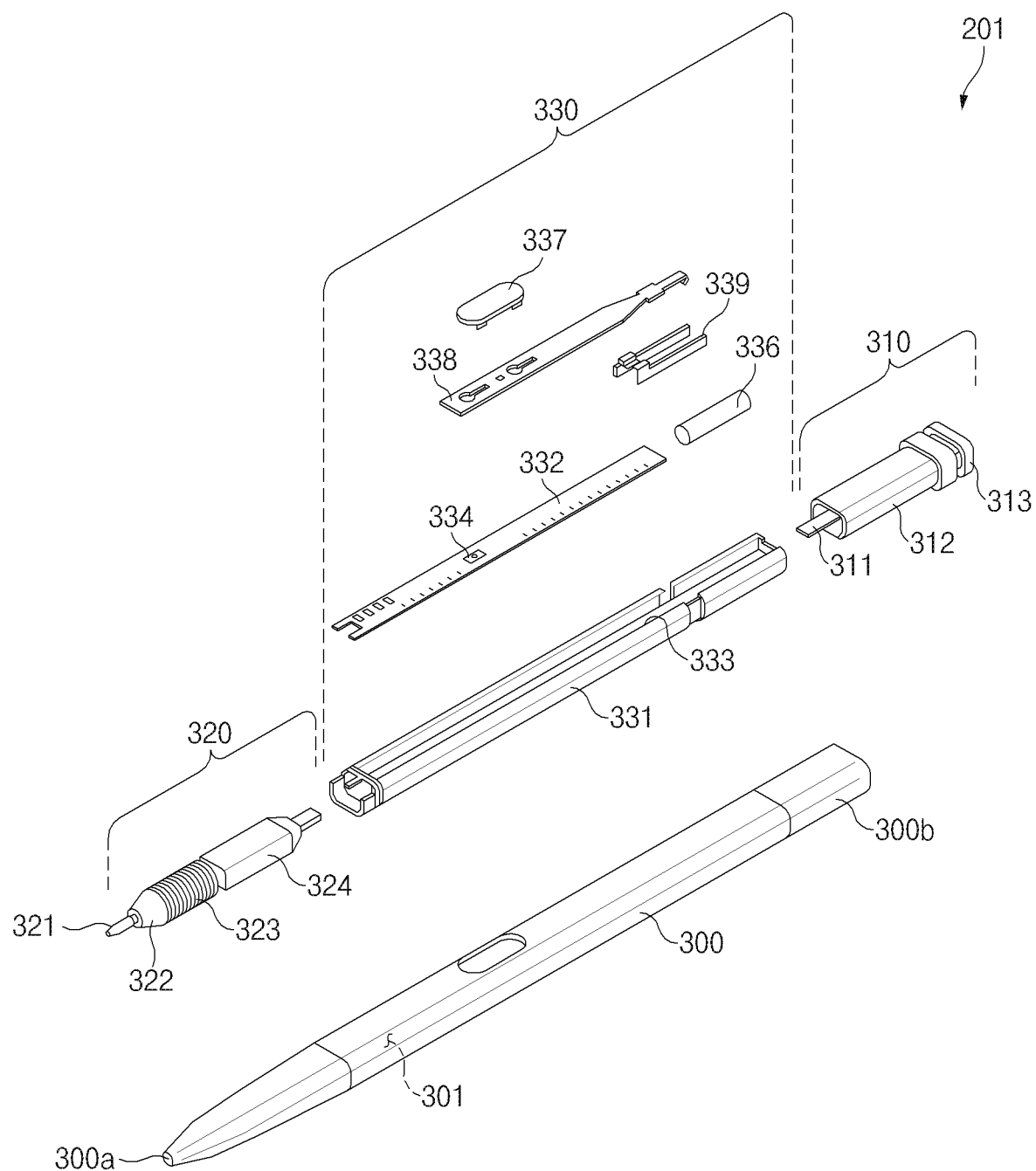
FIG. 3 is an exploded perspective view of a digital pen according to an embodiment.

FIG. 3 is an exploded perspective view of the digital pen 201 according to an embodiment.

Referring to FIG. 3, the digital pen 201 may include a pen housing 300 forming the exterior of the digital pen 201 and an inner assembly in the pen housing 300. In an embodiment illustrated, the inner assembly may include all the parts mounted within the pen and may be inserted into the pen housing 300 via one or more assembly operations.

According to an embodiment, the pen housing 300 may be elongated and include a first end portion 300a and a second end portion 300b and may include a receiving space 301 therein. The pen housing 300 may have an elliptical cross-sectional shape, which includes a short axis and a long axis. As such, the pen housing 300 may be in the shape of an elliptic cylinder on the whole. The receiving space 112 of the electronic device 101 may have an elliptical cross section that corresponds to the shape of the pen housing 300. The pen housing 300 may include a synthetic resin (e.g., plastic) and/or a metallic material (e.g., aluminum). According to an embodiment, the first end portion 300a of the pen housing 300 may be made of a synthetic resin material.

According to an embodiment, the inner assembly may have an elongated shape corresponding to the shape of the pen housing 300. The inner assembly may be roughly divided into three sections in the longitudinal direction, as shown in FIG. 3. For example, the inner assembly may include an ejection member 310 disposed at a location corresponding to the second end portion 300b of the pen housing 300, a coil part 320 disposed at a location corresponding to the first end portion 300a of the pen housing 300, and a circuit board part 330 disposed at a location corresponding to the body of the housing.

According to an embodiment, the ejection member 310 may include a component for pulling out the digital pen 201 from the receiving space 112 of the electronic device 101. According to an embodiment, the ejection member 310 may include a shaft 311, an ejection body 312, and a button part 313 disposed around the shaft 311 and making up an exterior of the ejection member 310. When the inner assembly is completely inserted into the pen housing 300, the part of the ejection member 310 including the shaft 311 and the ejection body 312 may be surrounded by the second end portion 300b of the pen housing 300. In contrast, and the button part 313 (e.g., 201a of FIG. 1) may be exposed to the outside of the second end portion 300b. A plurality of components (not illustrated), for example, cam members or elastic members, may be disposed in the ejection body 312 to form a push-pull structure. In an embodiment, the button part 313 may be substantially engaged with the shaft 311 to reciprocate linearly with respect to the ejection body 312. According to an embodiment, the button part 313 may include a button having a stopper structure that allows the user to pull out the digital pen 201 by using his/her fingers. According to an embodiment, the digital pen 201 may include a sensor for detecting the linear reciprocating motion of the shaft 311, thereby allowing the linear reciprocating motion to be used as another form of input.

According to an embodiment, the coil part 320 may include a pen tip 321 exposed to the outside of the first end portion 300a when the inner assembly is completely inserted into the pen housing 300, a packing ring 322, a coil 323 having a plurality of turns, and/or a pen pressure sensing unit 324 for obtaining a change in pressure when the pen tip 321 is pressed. The packing ring 322 may include epoxy, rubber, urethane, or silicon. The packing ring 322 may be provided for the purpose of waterproofing and dustproofing and may protect the coil part 320 and the circuit board part 330 from moisture or foreign particles when the electronic device 101 and/or the digital pen 201 are infiltrated by water or dust. According to an embodiment, the coil 323 may have a resonant frequency in a given frequency band (e.g., 500 kHz), and may be combined with at least one other element (e.g., a capacitive element or capacitor) to adjust the resonant frequency formed by the coil 323 within the given range of frequencies.

According to an embodiment, the circuit board part 330 may include a printed circuit board 332, a base 331 covering at least one surface of the printed circuit board 332, and an antenna. According to an embodiment, a substrate seating part 333, on which the printed circuit board 332 is disposed, may be formed on an upper surface of the base 331, and the printed circuit board 332 may be fixed when seated on the substrate seating part 333. According to an embodiment, the printed circuit board 332 may include an upper surface and a lower surface. A variable capacitor connected with the coil 323 or a switch 334 may be disposed on the upper surface, and a charging circuit, a battery, and/or a communication circuit may be disposed on the lower surface. The battery may include an electric double layered capacitor (EDLC). The charging circuit may be interposed between the coil 323 and the battery and may include voltage detector circuitry and a rectifier.

According to an embodiment, the antenna may include an antenna structure 339, which is illustrated in FIG. 3, and/or an antenna that is embedded in the printed circuit board 332, which is not shown in FIG. 3. According to an embodiment, the switch 334 may be provided on the printed circuit board 332. A side button 337 may be provided on the digital pen 201 and may be used to press the switch 334. The side button 337 may be exposed to the outside of the pen through a side opening (not illustrated) of the pen housing 300. The side button 337 may be supported by a supporting member 338. When there is no external force acting on the side button 337, the supporting member 338 may provide a restoring force such that the side button 337 is returned to or maintained at a specific location.

According to an embodiment, the circuit board part 330 may include additional packing rings such as O-rings. For example, O-rings made of elastic materials may be disposed at opposite ends of the base 331 to form a sealing structure between the base 331 and the pen housing 300. In any embodiment, the supporting member 338 may be at least partially in close contact with an inner wall of the pen housing 300 around the side opening for the side button 337 to form a sealing structure. For example, similar to the packing ring 322 of the coil part 320, the circuit board part 330 may have a waterproof and dustproof structure.

According to an embodiment, the digital pen 201 may include a battery mounting part (not illustrated) provided on the upper surface of the base 331 such that the battery 336 is disposed in the battery mounting part. The battery 336 that is able to be mounted on the battery mounting part may include, for example, a cylinder-type battery.

According to an embodiment, the digital pen 201 may include a microphone (not illustrated). The microphone may be directly connected with the printed circuit board 332 or may be connected with a separate flexible printed circuit board (FPCB) (not illustrated) connected with the printed circuit board 332. According to an embodiment, the microphone may be disposed parallel to the side button 337 in the longitudinal direction of the digital pen 201.

The embodiment described with reference to FIGS. 1 to 3 is an example of the digital pen 201 that is able to be inserted into the electronic device 101. The digital pen 201 may be a component that is independent of the electronic device 101. For example, the digital pen 201 may perform electro-magnetic induction (e.g., EMR, AES, or ECR)-based functions with another external electronic device (e.g., smartphone, tablet, or any other electronic device that includes a digitizer) and/or may perform wireless communication based on various short-range wireless communication protocols. For example, the short-range wireless communication protocol may comply with a Bluetooth standard or a Bluetooth low energy (BLE) standard defined by the Bluetooth special interest group (SIG).

Figure 4:
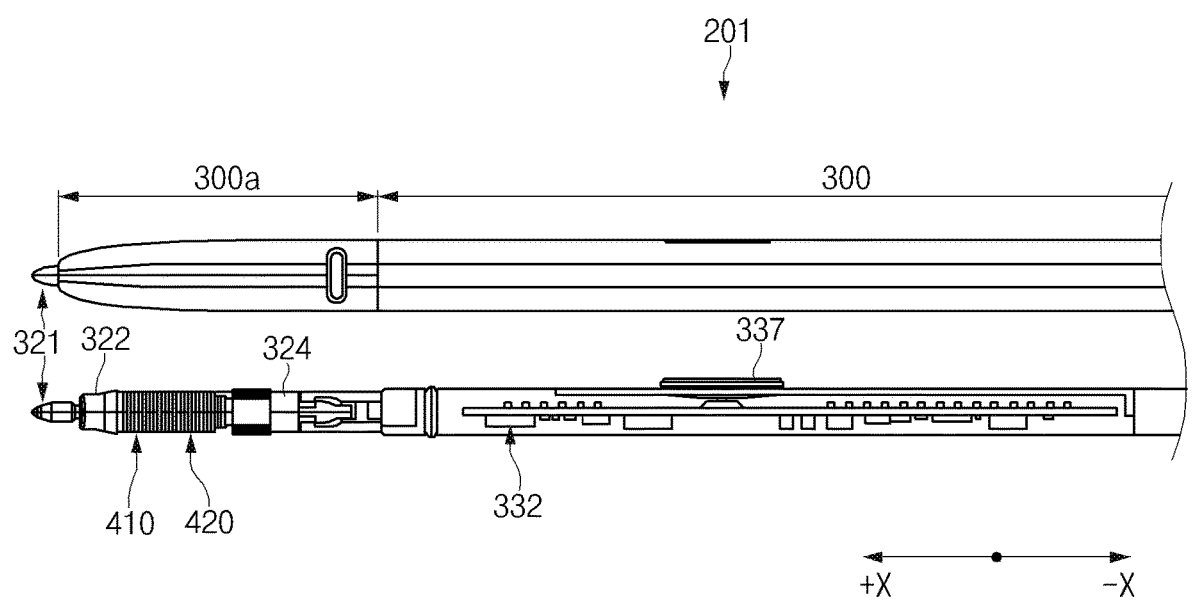
FIG. 4 are views illustrating the structure of a digital pen including a first coil and a second coil according to an embodiment.

FIG. 4 are views illustrating the structure of the digital pen 201 including a first coil 410 and a second coil 420 according to an embodiment.

Referring to FIG. 4, the first end portion 300a may be disposed at a front end (e.g., in the positive x-axis direction as shown in FIG. 4) of the digital pen 201. According to an embodiment, the first end portion 300a may include the pen tip 321, the packing ring 322, the pen pressure sensing unit 324, and/or the first coil 410 (e.g., the coil 323 of FIG. 3). According to an embodiment, the first end portion 300a may not include at least one of the above-mentioned components or may further include other additional components. For example, the first end portion 300a may not include at least one of the packing ring 322 or the pen pressure sensing unit 324. According to an embodiment, the first end portion 300a may be made of a synthetic resin (e.g., plastic) for the purpose of preventing degradation of the performance of electro-magnetic induction by the first coil 410.

According to an embodiment, the pen housing 300 may be disposed at the rear (e.g., in the negative x-axis direction) of the first end portion 300a. The pen housing 300 may include the printed circuit board 332 and the side button 337. According to an embodiment, the pen housing 300 may further include at least one of the components illustrated in FIG. 3, in addition to the components illustrated in FIG. 4. According to an embodiment, the pen housing 300 may be made of a metal material.

According to an embodiment, the first coil 410 may be configured to transfer a signal (or current) generated based on electro-magnetic induction. As such, the first coil 410 may be referred to as an "EMR coil." According to an embodiment, the first coil 410 may be wound around a longitudinal axis (e.g., the x-axis) of the pen housing 300 (or the first end portion 300a). Although not illustrated in FIG. 4, the first end portion 300a may further include a ferrite core that is extended along the longitudinal axis of the pen housing 300 (or the first end portion 300a). In this case, the first coil 410 may be wound around the ferrite core. According to an embodiment, the first coil 410 may include a solenoid coil.

According to an embodiment, the second coil 420 may be configured to transfer a signal (or current) generated based on a short-range wireless communication protocol. The second coil 420 may be referred to as a "BLE antenna coil" or a "Bluetooth antenna coil." In the case where the second coil 420 is disposed in the pen housing 300, such as on the printed circuit board 332, the performance of the second coil 420 may be reduced due to the influence of the user's hand grip or the metallic material of the pen housing 300. To avoid this, the second coil 420 may be disposed at the first end portion 300a. For example, the second coil 420 may be wound to surround the first coil 410. In another example, although not illustrated in FIG. 4, the second coil 420 may be wound at a different location from a location where the first coil 410 is wound. According to an embodiment, the length of a second conductive line forming the second coil 420 may be shorter than the length of a first conductive line forming the first coil 410.

Figure 5:
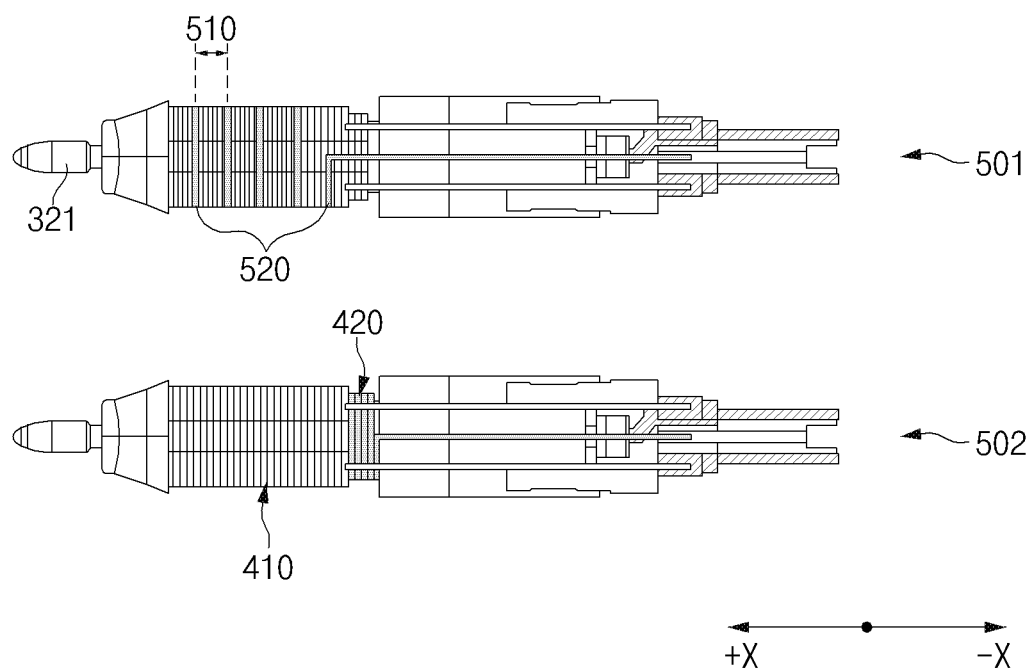
FIG. 5 are views illustrating the structure of a second coil disposed at a first end portion of a digital pen according to an embodiment.

FIG. 5 are views illustrating the structure of the second coil 420 disposed at the first end portion 300a of the digital pen 201 according to an embodiment.

Referring to FIG. 5, a first structure 501 illustrates an embodiment in which the second coil 420 is wound to surround the first coil 410, and a second structure 502 illustrates an embodiment in which the second coil 420 is wound at a different location from a location where the first coil 410 is wound.

Referring to the first structure 501, the second coil 420 may be wound on the first coil 410 at a specified interval 510 and with a specified number of turns 520. According to an embodiment, the specified interval 510 and the specified number of turns 520 may be determined based on the frequency band (e.g., 2.4 gigahertz (GHz) or 5 GHz) for the short-range wireless communication enabled by the second coil 420. For example, the specified interval 510 may be 1.2 mm, and the specified number of turns 520 may be 4 or 5. In the case where the second coil 420 is wound on the first coil 410, the coupling between the first coil 410 and the second coil 420 may necessitate an increase in the physical size of the second coil 420, and thus, the performance of antenna (e.g. the second coil 420) may be improved.

Referring to the second structure 502, the location where the second coil 420 is wound may be different from the location where the first coil 410 is wound. For example, the first coil 410 may be wound to be closer to the pen tip 321, and the second coil 420 may be wound at the rear (e.g., in the negative x-axis direction) of the location where the first coil 410 is wound. As the first coil 410 and the second coil 420 are wound at different locations, it may be possible to minimize the diameter of the first end portion 300a.

Below, embodiments will be described assuming the second coil 420 is wound on the first coil 410 (first structure 501). But aspects of the below disclosure may also be applicable to the embodiment (second structure 502) where the first coil 410 and the second coil 420 are wound at different locations.

Figure 6:
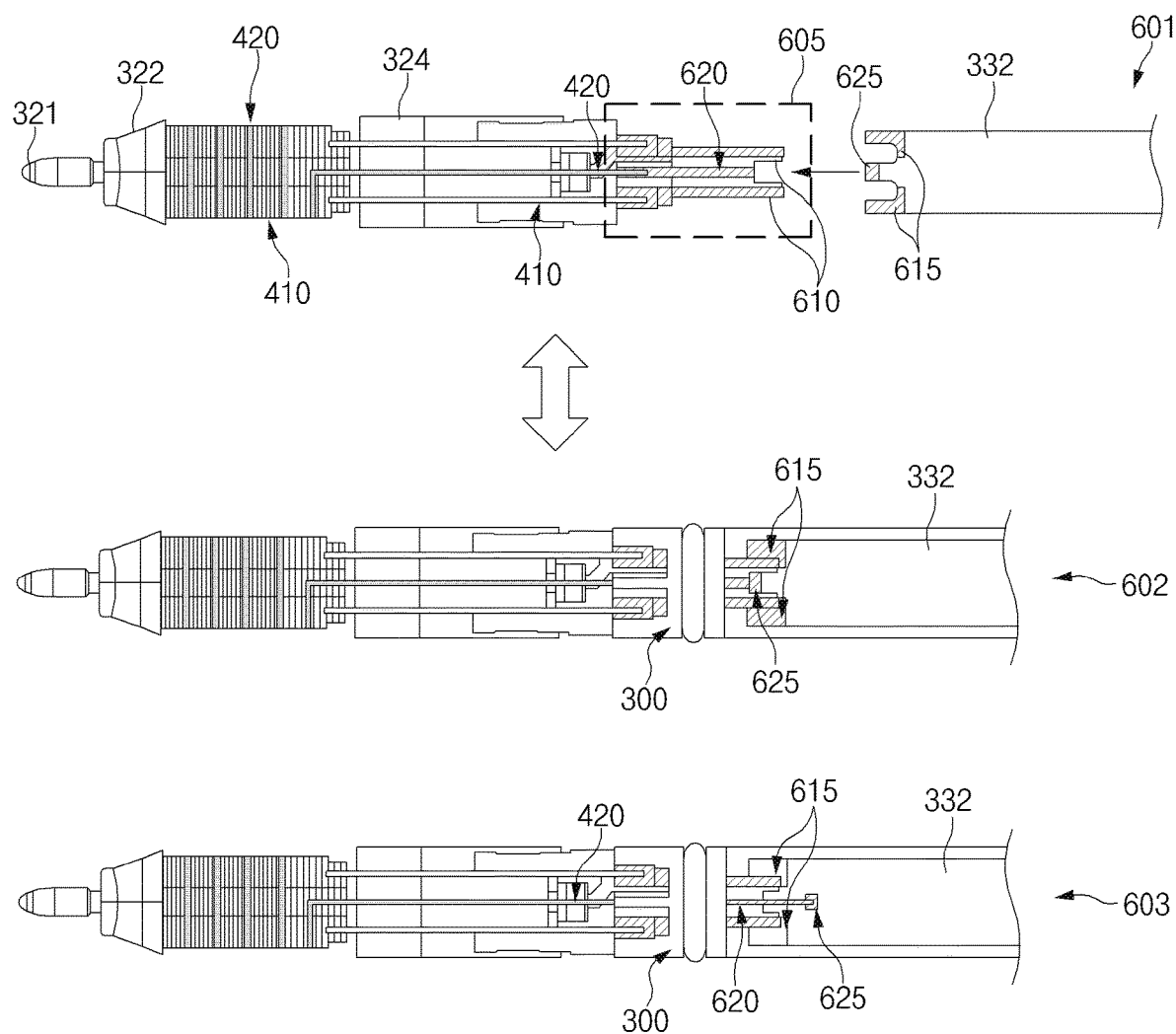
FIG. 6 are views illustrating the structure of a digital pen where a first coil and a second coil are connected to a printed circuit board, according to an embodiment.

FIG. 6 are views illustrating the structure of the digital pen 201 where the first coil 410 and the second coil 420 are connected to the printed circuit board 332, according to an embodiment.

Referring to FIG. 6, a first structure 601 indicates a structure where the first end portion 300a and the pen housing 300 are separated, and a second structure 602 and third structure 603 indicate structures where the first end portion 300a and the pen housing 300 are engaged.

Referring to the first structure 601, the digital pen 201 may include a connection member 605 at the rear (e.g., in the negative x-axis direction) of the pen pressure sensing unit 324 for the purpose of physically engaging the first end portion 300a and the printed circuit board 332. According to an embodiment, the connection member 605 may include a polymer structure that is non-conductive. According to an embodiment, the connection member 605 may include a first metal structure 610 configured to electrically connect the first coil 410 and a first pad 615 of the printed circuit board 332. The first metal structure 610 may be disposed in a partial region of the polymer structure. The connection member 605 may further include a second metal structure 620 configured to electrically connect the second coil 420 and a second pad 625 of the printed circuit board 332. The second metal structure 620 may be disposed in another partial region of the polymer structure. According to an embodiment, the first metal structure 610 and/or the second metal structure 620 may be formed by laser direct structuring (LDS).

Referring to the second structure 602 or third structure 603, the first end portion 300a may be physically engaged with the pen housing 300 including the printed circuit board 332 through the connection member 605. When the first end portion 300a and the printed circuit board 332 are engaged, the first coil 410 may be electrically connected with a charging circuit (e.g., 288 of FIG. 2) or a resonant circuit (e.g., 287 of FIG. 2) through the first metal structure 610 and the first pad 615 disposed on the printed circuit board 332, and the second coil 420 may be electrically connected with a communication circuit (e.g., 290 of FIG. 2) through the second metal structure 620 and the second pad 625 disposed on the printed circuit board 332. According to an embodiment, the first coil 410 may be fed with power from the printed circuit board 332 through the first metal structure 610, and the second coil 420 may be fed with power from the printed circuit board 332 through the second metal structure 620.

According to an embodiment, to reduce electrical interference between the first pad 615 and the second pad 625, the first metal structure 610 and the second metal structure 620 may have different lengths. For example, as illustrated in the second structure 602, the second metal structure 620 may be shorter than the first metal structure 610. In another example, as illustrated in the third structure 603, the second metal structure 620 may be longer than the first metal structure 610.

Figure 7:
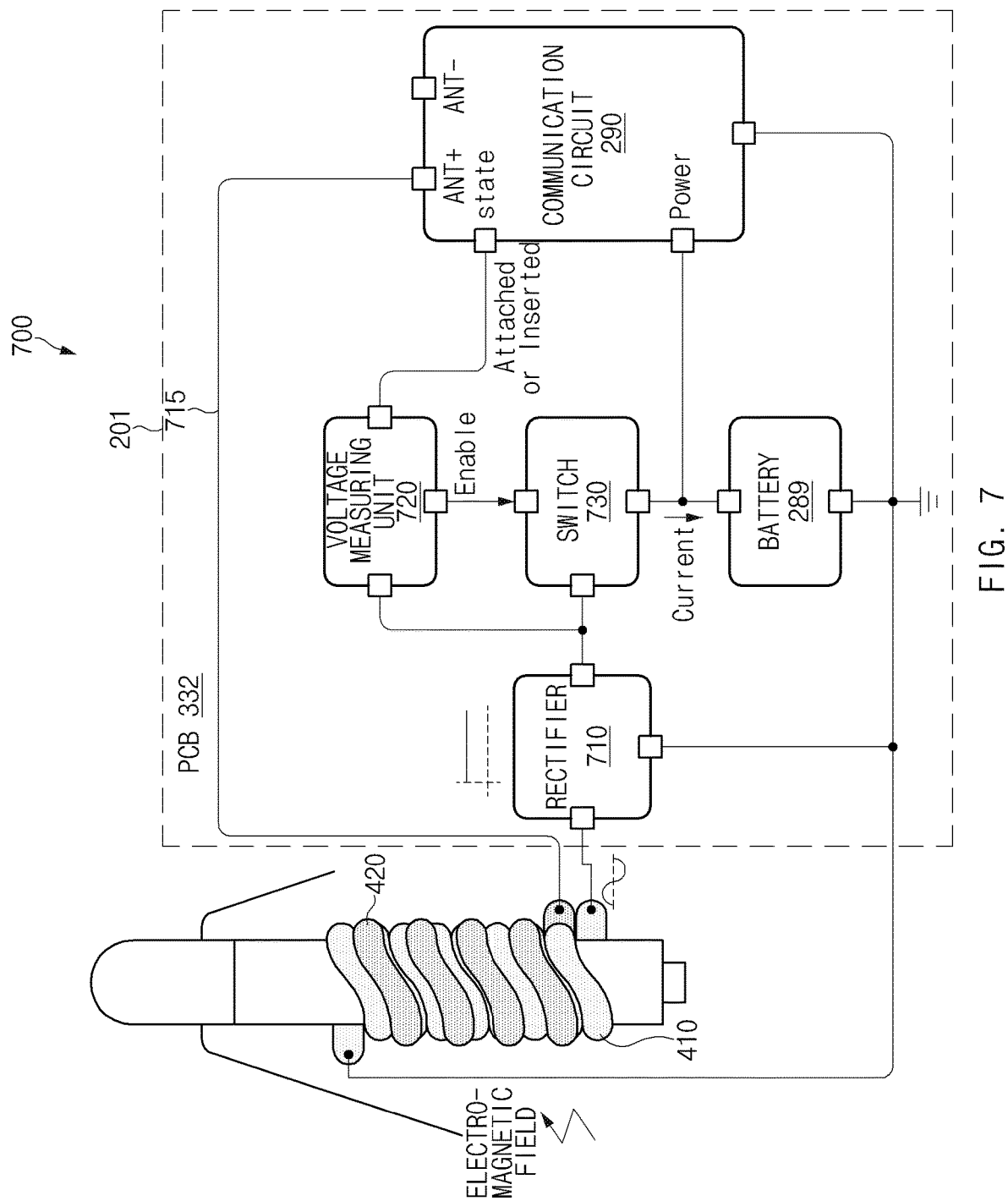
FIG. 7 is a circuit diagram illustrating a digital pen in which a second coil is connected with a communication circuit in an open state, according to an embodiment.
Figure 8:
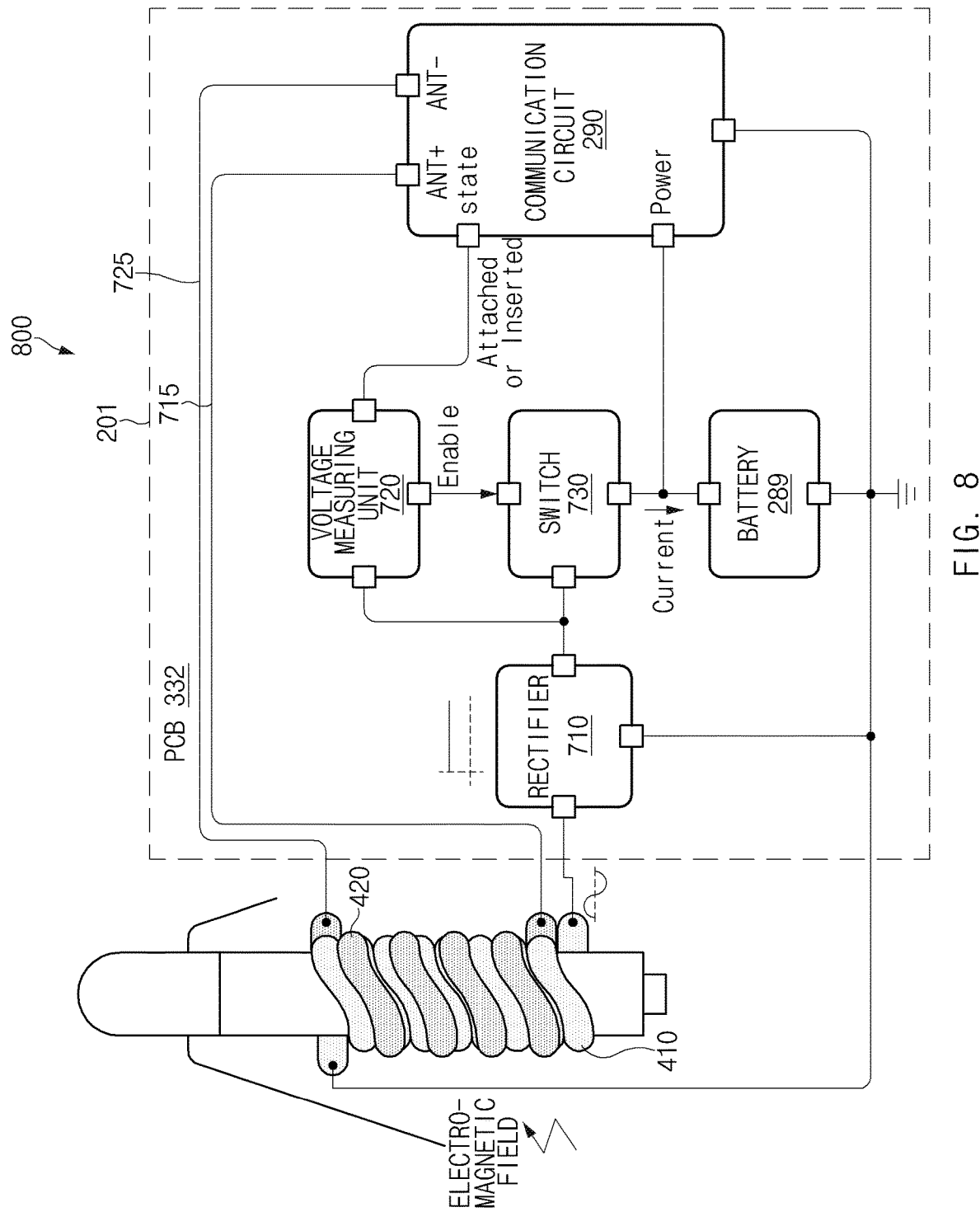
FIG. 8 is a circuit diagram illustrating a digital pen in which a second coil is connected with a plurality of electrodes of a communication circuit, according to an embodiment.

FIG. 7 and FIG. 8 are circuit diagrams illustrating the digital pen 201 in which the second coil 420 is connected with the communication circuit 290, according to two embodiments. FIG. 7 is a circuit diagram 700 of the digital pen 201 where the second coil 420 is connected with the communication circuit 290 in an open state, and FIG. 8 is a circuit diagram 800 of the digital pen 201 where the second coil 420 is connected with a plurality of electrodes of the communication circuit 290.

Referring to the circuit diagram 700 of FIG. 7, the digital pen 201 may include at least one of the first coil 410, the second coil 420, a rectifier 710, a voltage measuring unit 720, a switch 730, the battery 289, and/or the communication circuit 290. The components of the digital pen 201 illustrated in FIG. 7 are only an example. According to another embodiment, the digital pen 201 may further include at least one of the other components shown in FIG. 2.

According to an embodiment, the first coil 410 may sense an electro-magnetic signal from an external electronic device (e.g., the electronic device 101 of FIG. 1) and may output a signal of a specific frequency to the rectifier 710. For example, resonance may occur at the first coil 410 caused by an electro-magnetic field, and a corresponding electrical signal may be output from the first coil 410.

When the digital pen 201 is inserted into an insertion hole (e.g., the hole 111 or the receiving space 112 of FIG. 1) of an electronic device for the purpose of charging the battery 289 of the digital pen 201, the external electronic device may detect whether the digital pen 201 is inserted into the insertion hole, by a coil (not illustrated) disposed at a portion of the insertion hole of the external electronic device. After the insertion of the digital pen 201 is detected, the external electronic device may charge the battery 289 by applying a signal for charging the battery 289 to the first coil 410 through the coil disposed at the portion of the insertion hole of the external electronic device.

To detect whether the digital pen 201 is inserted into the insertion hole, a digitizer controller (not illustrated) included in the external electronic device may apply a transmission (Tx) signal through its coil at regular time intervals. When the coil of the external electronic device and the first coil 410 of the digital pen 201 are disposed adjacent to each other when the digitizer controller transmits the Tx signal through the coil, an electro-magnetic field may be generated between the coil of the external electronic device and the first coil 410.

According to an embodiment, the rectifier 710 may convert an alternating current received through the first coil 410 into a direct current and may transfer the direct current to the voltage measuring unit 720 and the switch 730.

According to an embodiment, based on the direct current transferred from the rectifier 710, the voltage measuring unit 720 may identify whether the signal applied to the first coil 410 by the external electronic device is a detection signal for detecting a location of the digital pen 201, or a charging signal for charging the battery 289 of the digital pen 201. For example, the voltage value of a rectified charging signal may be different from the voltage value of a rectified detection signal. The voltage measuring unit 720 may compare the voltage value of the rectified current with at least one threshold voltage value set in advance and may output one of an enable signal for controlling the switch 730 to an on state or a disable signal for controlling the switch 730 to an off state based on a result of the comparison. For example, the at least one threshold voltage value may be set so that the enable signal is output when the rectified charging signal is input to the voltage measuring unit 720 and the disable signal is output when the rectified detection signal is input to the voltage measuring unit 720.

According to an embodiment, for the digital pen 201 to perform short-range wireless communication with an external electronic device, while the battery 289 is charged, the voltage measuring unit 720 may supply a current to the communication circuit 290. At least a portion of a current flowing from the switch 730 to the battery 289 may be transferred to the communication circuit 290. The communication circuit 290 may transmit or receive short-range wireless communication signals by using the second coil 420.

According to an embodiment, because the communication circuit 290 is able to operate while the battery 289 is charged, to reduce indirect interference caused by the current flowing through the first coil 410 or the second coil 420, the path connecting the second coil 420 and the communication circuit 290 may be independent of the path connecting the first coil 410 and the charging circuit 288.

According to an embodiment, the second coil 420 may be connected with the communication circuit 290 in an open state. For example, a partial path (e.g., a first path 715) of the second coil 420 may be connected to one electrode (e.g., a (+) electrode) of the communication circuit 290, and the remaining portion thereof may be in an open state. When the second coil 420 is in the open state, performance of the antenna (e.g. the second coil 420) at a specified level (e.g., −7 decibel (dB)) may be secured by adjusting at least one of the interval (e.g., 510 of FIG. 5) at which the second coil 420 is wound or the number of turns (e.g., 520 of FIG. 5) of the second coil 420.

Referring to the circuit diagram 800 of FIG. 8, the second coil 420 may be connected to a plurality of electrodes (e.g., a (+) electrode and a (−) electrode) of the communication circuit 290. For example, the first path 715 may be connected to the (+) electrode, and a second path 725 may be connected to the (−) electrode. When the second coil 420 is connected to the plurality of electrodes, the digital pen 201 may perform a plurality of short-range wireless communication operations by using the communication circuit 290 or a separate communication circuit in addition to the communication circuit 290. For example, the digital pen 201 may perform wireless communication that is based on at least one of Bluetooth protocol, BLE protocol, or near field communication (NFC) protocol.

Figure 9:
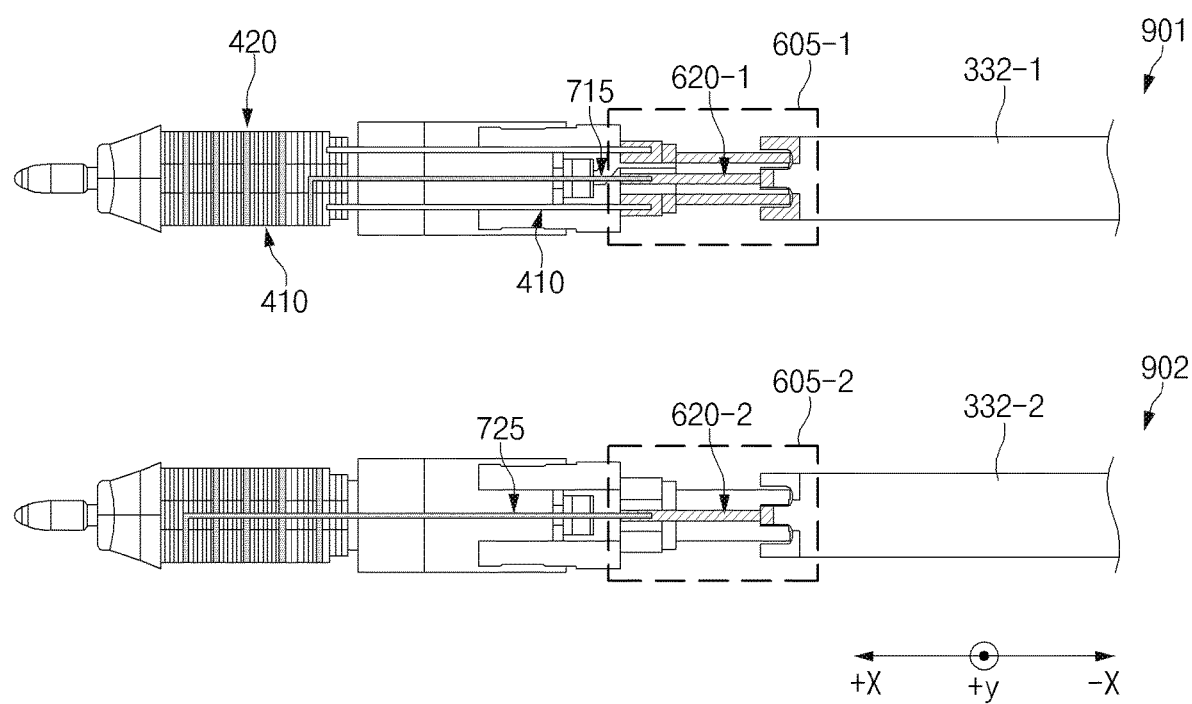
FIG. 9 are views illustrating the structure of a digital pen where a second coil connected to a plurality of electrodes of a communication circuit is connected to a printed circuit board, according to an embodiment.

FIG. 9 are views illustrating the structure of the digital pen 201 where the second coil 420 connected to a plurality of electrodes of the communication circuit 290 is connected to the printed circuit board 332, according to an embodiment.

Referring to FIG. 9, a first structure 901 indicates a structure of the digital pen 201 when viewed from top (e.g., in the positive y-axis direction), and a second structure 902 indicates a structure of the digital pen 201 when viewed from bottom (e.g., in the negative y-axis direction). The first structure 901 may correspond to the second structure 602 or the third structure 603 of FIG. 6. Referring to the first structure 901, the first path 715 may be disposed on a front surface (e.g., 332-1) of the printed circuit board 332 through a front surface (e.g., 620-1) of the second metal structure 620 disposed on a front surface (e.g., 605-1) of the connection member 605. Referring to the second structure 902, the second path 725 may be disposed on a back surface (e.g., 332-2) of the printed circuit board 332 through a back surface (e.g., 620-2) of the second metal structure 620 disposed on a back surface (e.g., 605-2) of the connection member 605.

Figure 10:
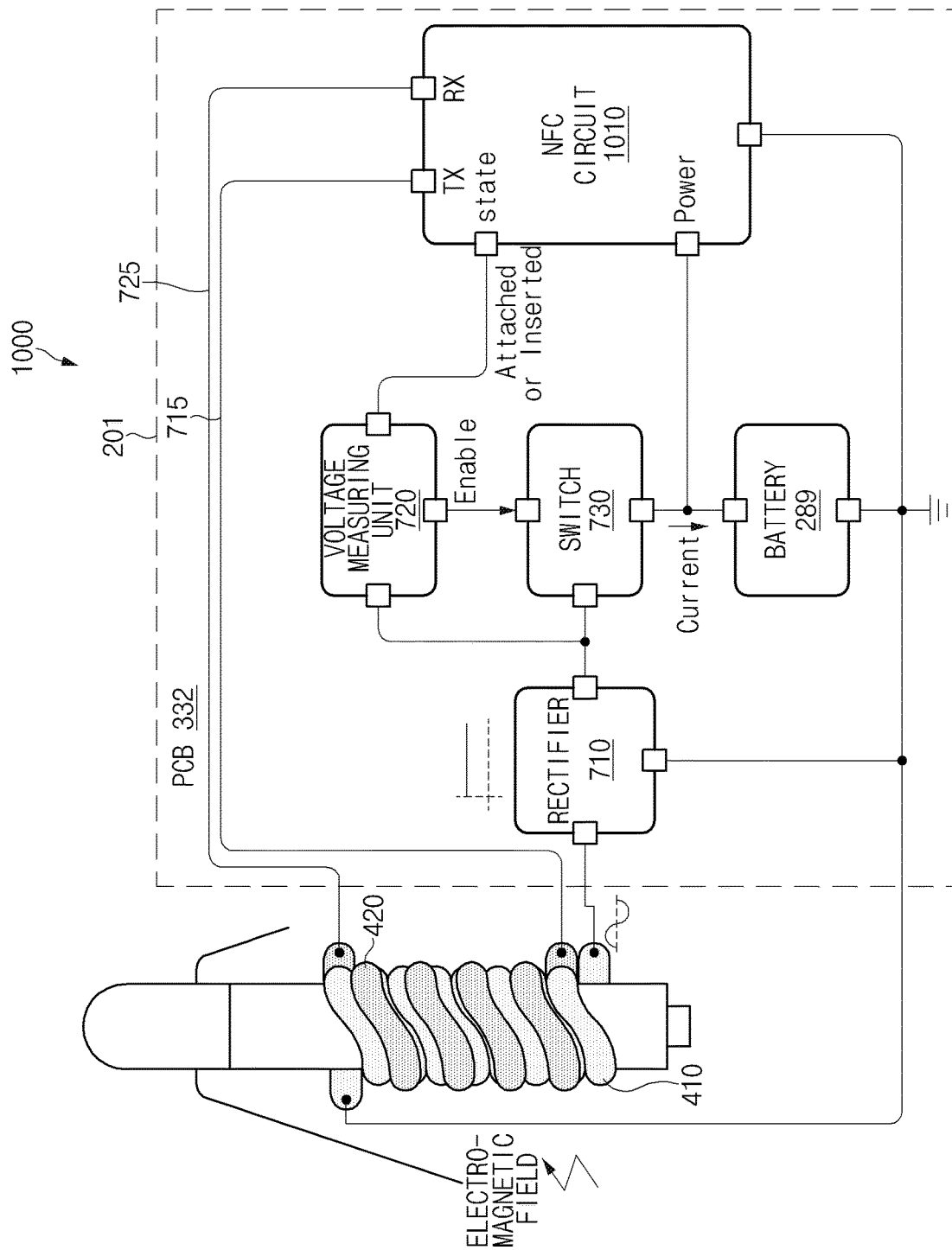
FIG. 10 is a circuit diagram illustrating a digital pen that performs a near field communication (NFC) function by using a second coil, according to an embodiment.

FIG. 10 is a circuit diagram 1000 illustrating the digital pen 201 that performs a near field communication (NFC) function by using the second coil 420, according to an embodiment.

Referring to the circuit diagram 1000 of FIG. 10, the digital pen 201 may further include an NFC circuit 1010. Although not illustrated in FIG. 10, the digital pen 201 may further include a wireless fidelity (Wi-Fi) circuit in addition to the NFC circuit 1010. According to an embodiment, the second coil 420 may be connected with a plurality of electrodes (e.g., a reception (Rx) electrode and a transmission (Tx) electrode) of the NFC circuit 1010. For example, the first path 715 may be connected to the Tx electrode, and the second path 725 may be connected to the Rx electrode.

As described above, an electronic device (e.g., 201 of FIG. 1) may include a housing (e.g., 300 of FIG. 3) that includes a first end portion (e.g., 300a of FIG. 3) and a second end portion (e.g., 300b of FIG. 3), a pen tip (e.g., 321 of FIG. 3) that is disposed at the first end portion, a first coil (e.g., 410 of FIG. 3) that is disposed in the housing in the vicinity of the first end portion, is wound around an axis of the housing, and includes a first conductive line of a first length, and a second coil (e.g., 420 of FIG. 4) that surrounds the first coil, is wound around the axis of the housing, and includes a second conductive line of a second length shorter than the first length.

According to an embodiment, the electronic device may further include a ferrite core disposed in the housing and extended along the axis, and the first coil may be wound around the ferrite core.

According to an embodiment, the first coil may include a solenoid coil.

According to an embodiment, the electronic device may further include a resonant circuit disposed in the housing, where the resonant circuit includes the first coil.

According to an embodiment, the resonant circuit may be electrically connected to a charging circuit (e.g., 288 of FIG. 2).

According to an embodiment, the electronic device may further include a wireless communication circuit (e.g., 290 of FIG. 2) disposed in the housing and electrically connected to the second coil.

According to an embodiment, the wireless communication circuit may be based on at least one of a Bluetooth standard or a Bluetooth low energy (BLE) standard.

According to an embodiment, the electronic device may further include a polymer structure disposed in the housing, and the polymer structure may include a first metal structure (e.g., 610 of FIG. 6) electrically connected to the first coil, and a second metal structure (e.g., 620 of FIG. 6) electrically connected to the second coil.

According to an embodiment, the electronic device may further include a printed circuit board (e.g., 332 of FIG. 3) disposed in the housing, and the first coil and the second coil may be electrically connected to the printed circuit board.

As described above, a digital pen (e.g., 201 of FIG. 1) may include a housing (e.g., 300 of FIG. 3) that includes a first end portion (e.g., 300a of FIG. 3) and a second end portion (e.g., 300b of FIG. 3) and is made of metal, a pen tip (e.g., 321 of FIG. 3) that is disposed at the first end portion, a first coil (e.g., 410 of FIG. 4) that is disposed in the housing in the vicinity of the first end portion (or disposed adjacent to the first end portion), is wound around an axis of the housing, and radiates a signal based on electro-magnetic induction, and a second coil (e.g., 420 of FIG. 4) that surrounds the first coil, is wound around the axis of the housing, and radiates a signal based on a short-range wireless communication protocol.

According to an embodiment, the digital pen may further include a ferrite core disposed in the housing and extended along the axis, and the first coil may be wound around the ferrite core.

According to an embodiment, the first coil may include a solenoid coil.

According to an embodiment, the digital pen may further include a resonant circuit (e.g., 287 of FIG. 2) disposed in the housing, where the resonant circuit includes the first coil.

According to an embodiment, the resonant circuit may be electrically connected to a charging circuit (e.g., 288 of FIG. 2).

According to an embodiment, the digital pen may further include a wireless communication circuit (e.g., 290 of FIG. 2) disposed in the housing and electrically connected to the second coil.

According to an embodiment, the wireless communication circuit may be based on at least one of a Bluetooth standard or a Bluetooth low energy (BLE) standard.

According to an embodiment, the digital pen may further include a polymer structure disposed in the housing, and the polymer structure may include a first metal structure (e.g., 610 of FIG. 6) electrically connected to the first coil, and a second metal structure (e.g., 620 of FIG. 6) electrically connected to the second coil.

According to an embodiment, the digital pen may further include a printed circuit board (e.g., 332 of FIG. 2) disposed in the housing, and the first coil and the second coil may be electrically connected to the printed circuit board.

As described above, an electronic device (e.g., 101 of FIG. 1) may include a housing (e.g., 110 of FIG. 1), a first wireless communication circuit (not illustrated), and a digital pen (e.g., 201 of FIG. 1) that is capable of being inserted into an inner space of the housing. The digital pen may include a pen housing (e.g., 300 of FIG. 3) that includes a first end portion (e.g., 300a of FIG. 3) and a second end portion (e.g., 300b of FIG. 3), a pen tip (e.g., 321 of FIG. 3) that is disposed at the first end portion, a second wireless communication circuit (e.g., 290 of FIG. 2) that is disposed in the pen housing and communicates with the first wireless communication circuit based on a short-range wireless communication protocol, a first coil (e.g., 410 of FIG. 4) that is disposed in the pen housing in the vicinity of the first end portion (or disposed adjacent to the first end portion), is wound around an axis of the housing, and includes a first conductive line of a first length, and a second coil (e.g., 420 of FIG. 4) that is electrically connected with the second wireless communication circuit, surrounds the first coil, is wound around the axis of the housing, and includes a second conductive line of a second length shorter than the first length.

According to an embodiment, the short-range wireless communication protocol may be a Bluetooth standard or a Bluetooth low energy (BLE) standard.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that disclosed embodiments of the disclosure and terms used in the embodiments do not intend to limit technical features disclosed in the disclosure to the particular forms disclosed herein; rather, the disclosure should be construed to cover various modifications, equivalents, or alternatives of embodiments of the disclosure. With regard to description of drawings, similar or related components may be assigned with similar reference numerals. As used herein, singular form of noun corresponding to an item may include one item or a plurality of items unless the context clearly indicates otherwise. In the disclosure disclosed herein, each of the expressions "A or B," "at least one of A and B," "at least one of A or B," "A, B, or C," "one or more of A, B, and C," and "one or more of A, B, or C" may include any and all combinations of one or more of the associated listed items. The expressions "a first," "a second," "the first," or "the second," used in herein, may be merely used to distinguish a component from the other components and do not limit the corresponding components to other aspects (e.g., importance or order). It should be understood that when a component (e.g., a first component) is referred to as being "connected," or "coupled," to another component (e.g., a second component) with or without the terms such as "operatively" or "communicatively," the component may be directly (e.g., wired) or wirelessly connected or coupled to the other component or any other component (e.g., a third component) may be interposed between them.

The term "module" used herein may represent, for example, a unit including one or more combinations of hardware, software and firmware. The term "module" may be interchangeably used with the terms "logic," "logical block," "part," and "circuit." The "module" may be a minimum unit of an integrated part or may be a part thereof.

The "module" may be a minimum unit for performing one or more functions or a part thereof. According to an embodiment, the "module" may be implemented with an application-specific integrated circuit (ASIC).

Various embodiments of the disclosure may be implemented by software (e.g., the program 140) including one or more instructions stored in a machine-readable storage media (e.g., an internal memory 136 or an external memory 138) readable by a machine (e.g., the electronic device 101). For example, a processor (e.g., the processor 120) of the machine (e.g., the electronic device 101) may call at least one instruction among one or more instructions stored in the storage medium and may execute the instruction. This means that the machine is to be operated to perform at least one function in accordance with the at least one instruction being called. The one or more instructions may include a code generated by a compiler or a code to be executed by an interpreter. The machine-readable storage media may be provided in the form of non-transitory storage media. Here, the term "non-transitory," as used herein, is a limitation of the medium itself (i.e., tangible, not a signal) as opposed to a limitation on data storage persistency.

According to an embodiment, the method according to certain embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed (e.g., download or upload) through an application store (e.g., a Play Store™) or between two user devices (e.g., smartphones) directly or through on-line. In the case of online distribution, at least a portion of the computer program product may be temporarily stored or generated in a machine-readable storage medium such as a memory of a manufacturer's server, an application store's server, or a relay server.

According to certain embodiments, each component (e.g., the module or the program) of the above-described components may include one entity or a plurality of entities. According to certain embodiments, one ore mode components among the above-described components or operations may be omitted, or one or more other components or operations may be added. Alternatively or additionally, some components (e.g., the module or the program) may be integrated in one component. In this case, the integrated component may perform the same or similar one or more functions of each component of the plurality of components performed by each corresponding components among the plurality of components prior to the integration. According to certain embodiments, operations performed by a module, a programming, or other components may be executed sequentially, in parallel, repeatedly, or in a heuristic method. Also, at least some operations may be executed in different sequences, omitted, or other operations may be added.

According to certain embodiments of the disclosure, a digital pen may perform a plurality of near-field wireless communication functions by using a second coil supporting short-range wireless communication.

According to certain embodiments of the disclosure, the metallic housing of the digital pen may be prevented from degrading the performance of the antenna supporting short-range wireless communication.

In addition, a variety of properties directly or indirectly understood through this disclosure may be provided.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a pen housing including a first end portion and a second end portion;
   a pen tip disposed at the first end portion;
   a first coil disposed in the housing adjacent to the first end portion, wound around a central axis of the pen housing, and including a first conductive line of a first length; and
   a second coil surrounding the first coil, wound around the central axis of the pen housing, and including a second conductive line of a second length shorter than the first length;
   a charging circuit electrically configured to charge a battery with a first signal electro-magnetically induced on the first coil;
   a communication circuit configured to receive a second signal from the second coil; and
   wherein the charging circuit provides current directly to the communication circuit.

2. The electronic device of claim 1, further comprising:
   a ferrite core disposed in the pen housing and extended along the central axis,
   wherein the first coil is wound around the ferrite core.

3. The electronic device of claim 1, wherein the first coil includes a solenoid coil.

4. The electronic device of claim 1, further comprising:
   a resonant circuit disposed in the pen housing, wherein the resonant circuit includes the first coil.

5. The electronic device of claim 4, wherein the resonant circuit is electrically connected to the charging circuit.

6. The electronic device of claim 1, wherein the communication circuit is further configured to receive the second signal based on at least one of a Bluetooth standard or a Bluetooth low energy (BLE) standard.

7. The electronic device of claim 1, further comprising:
   a polymer structure disposed in the pen housing, wherein the polymer structure further includes:
   a first metal structure electrically connected to the first coil; and
   a second metal structure electrically connected to the second coil.

8. The electronic device of claim 1, further comprising:
a printed circuit board disposed in the pen housing,
wherein the first coil and the second coil are electrically connected to the printed circuit board.

9. A digital pen comprising:
a pen housing including a first end portion and a second end portion and made of metal;
a pen tip disposed at the first end portion;
a first coil disposed in the housing adjacent to the first end portion, wound around a central axis of the pen housing, and configured to radiate a signal based on electromagnetic induction;
a second coil surrounding the first coil, wound around the central axis of the pen housing, and configured to radiate a signal based on a short-range wireless communication protocol;
a charging circuit electrically configured to charge a battery with a first signal electro-magnetically induced on the first coil;
a communication circuit configured to receive a second signal from the second coil; and
wherein the charging circuit provides current directly to the communication circuit.

10. The digital pen of claim 9, further comprising:
a ferrite core disposed in the pen housing and extended along the axis,
wherein the first coil is wound around the ferrite core.

11. The digital pen of claim 9, wherein the first coil includes a solenoid coil.

12. The digital pen of claim 9, further comprising:
a resonant circuit disposed in the pen housing, wherein the resonant circuit includes the first coil.

13. The digital pen of claim 12, wherein the resonant circuit is electrically connected to the charging circuit.

14. The digital pen of claim 9, wherein the communication circuit is further configured to receive the second signal based on at least one of a Bluetooth standard or a Bluetooth low energy (BLE) standard.

15. The digital pen of claim 9, further comprising:
a polymer structure disposed in the pen housing,
wherein the polymer structure further includes:
a first metal structure electrically connected to the first coil; and
a second metal structure electrically connected to the second coil.

16. The digital pen of claim 9, further comprising:
a printed circuit board disposed in the pen housing,
wherein the first coil and the second coil are electrically connected to the printed circuit board.

17. An electronic device comprising:
a housing:
a first wireless communication circuit; and
a digital pen capable of being inserted into an inner space of the housing,
wherein the digital pen includes:
a pen housing including a first end portion and a second end portion and made of metal;
a pen tip disposed at the first end portion;
a second wireless communication circuit disposed in the pen housing, and configured to communicate with the first wireless communication circuit based on a short-range wireless communication protocol;
a first coil disposed in the pen housing adjacent to the first end portion, wound around an central axis of the pen housing, and including a first conductive line of a first length;
a second coil electrically connected with the second wireless communication circuit, surrounding the first coil, wound around the central axis of the pen housing, and including a second conductive line of a second length shorter than the first length; and
a charging circuit electrically configured to charge a battery of the digital pen with a first signal electro-magnetically induced on the first coil,
wherein the charging circuit provides current directly to the second wireless communication circuit.

18. The electronic device of claim 17, wherein the short-range wireless communication protocol is at least one of a Bluetooth standard or a Bluetooth low energy (BLE) standard.

* * * * *